Aug. 17, 1926.

R. STAR 1,596,774

LIQUID LEVEL GAUGE

Filed July 5, 1924

WITNESSES
Edw. Thorpe
A. L. Kitchin.

INVENTOR
Richard Star
BY
ATTORNEYS

Patented Aug. 17, 1926.

1,596,774

UNITED STATES PATENT OFFICE.

RICHARD STAR, OF BROOKLYN, NEW YORK.

LIQUID-LEVEL GAUGE.

Application filed July 5, 1924. Serial No. 724,328.

This invention relates to gauges for liquid containing tanks and particularly to an improved gauge for oil tanks of ships or other containers where the oil or liquid is partially above and partially below or all above and all below the gauge.

An object of the invention is to provide an improved construction wherein the indicating part of the gauge may be located at any desired point and accurately indicate the level of oil or other liquid in a container.

Another object of the invention is to provide a gauge wherein part of the structure is located in the tank and part above the tank.

In the accompanying drawing—

Figure 1:
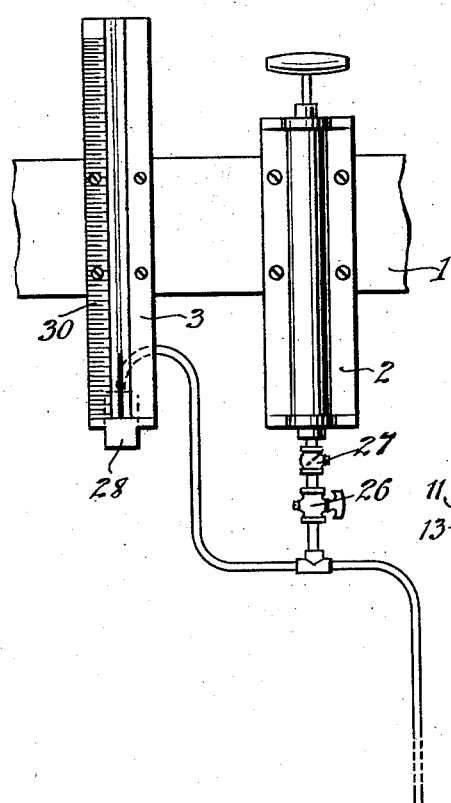
Figure 1 is a fragmentary view partly in elevation and partly in section, showing in a more or less schematic manner one embodiment of the invention.

Referring to the accompanying drawing by numerals, 1 indicates a beam of a ship to which the pump 2 is connected and also to which the indicating member 3 is connected. The ship is provided with what is known as a double bottom 4 and between this bottom and the outside bottom 5 oil 6 is placed. This oil may be as shown in Figure 1 or may completely fill the space 7 at the lowermost point of the ship and extend up partly at each side. Also it is evident that the device could be applied directly to a tank arranged in the ship or at any other desired point and function in the same manner so that the term "container" or "tank" will indicate not only members of this kind but also the double bottom of ships.

Figure 2:
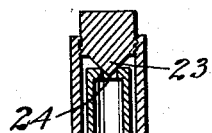
Figure 2 is a vertical sectional view through an actuator embodying certain features of the invention.
Figure 2:
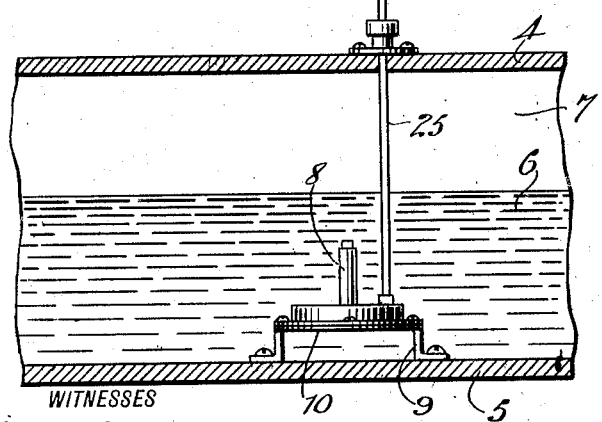

Arranged in the container is a member 8 known as an actuator. This member or actuator is provided with suitable supporting legs 9 for spacing the operating parts above the bottom of the container. As indicated in Figure 2, the legs 9 are provided with an annular ring 10 co-acting with the annular flange 11 of the hood or casing 12 whereby the edge section 13 of the diaphragm 14 may be rigidly clamped in place by suitable screws or bolts 15. The diaphragm 14 may be made of suitable material, as for instance, metal. The center of the diaphragm 14 fits over the threaded extension 16 of the tube 17 and bears against the shoulder 18. A nut 19 presses the diaphragm against the shoulder 18 until an air and oil tight connection is provided. It will be noted that the tube 17 is of less diameter than the pipe 20 sufficiently to provide an appreciable air space therebetween whereby air may pass from the chamber 21 upwardly into the air space 22 and from thence pass the valve member 23 into the tube 17 through the aperture 24. The pipe 20 is screwed into the hood 12 and opens at the lower end into the chamber 21 while the upper end is internally threaded for receiving the valve member 23 which is screwed therein and so located that when the parts are in the position shown in Figure 2 this valve member will close the passage-way or aperture 24.

Figure 3:
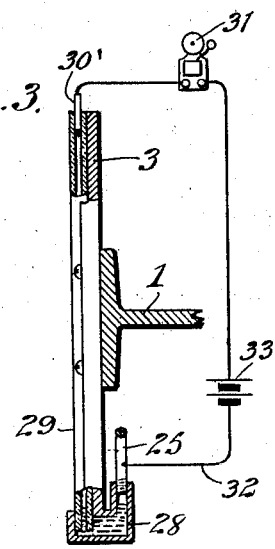
Figure 3 is an edge view of the indicating structure shown in Figure 1, part being shown in section.

When the oil is as shown in Figure 1, the pressure thereof will act on the diaphragm 14 and move the same to the position shown in Figure 2. This will be the normal position and the parts will remain in this position until sufficient air has been pumped into the chamber 21 to cause the tube 17 to move away from the valve member 23. A very small pipe 25 is connected with hood 12 and opens into chamber 21, said pipe extending to the indicating member 3 which as heretofore stated, may be located in any part of the ship. The pump 2 is interposed in the pipe 25, said pump being provided with a cock 26 and a check valve 27 which will permit air to pass from the pump into the pipe 25 but will prevent air from passing in the opposite direction. The upper end of pipe 25 shown in Figure 3, is connected to a mercury container 28, said mercury container being also in free communication with the glass tube 29 arranged adjacent the graduations 30. Under normal conditions, the mercury is as shown in Figures 1 and 3 but when air is pumped into the chamber 21, a corresponding pressure will be created in the upper part of the mercury container 28 whereby a certain quantity of mercury will be forced upwardly in the tube 29.

In order to get an accurate reading, the pump 2 is operated until the observer notices that the mercury is moving up and down with the pump but making no further permanent upward movement. This action is produced when the pressure in the chamber 21 is the same as the pressure outside of this chamber. When this is the case, any additional air forced into the pipe 25 will cause the mercury immediately to rise and also will cause the tube 17 to move away from the valve member 23 and thereby permit the air to escape into the oil which will relieve the pressure in chamber 21 and permit the mercury to drop back to its balancing position. When this bobbing up and down of the mercury is observed, the operation of the pump 2 is stopped and as soon as the mercury is quiet, a reading is taken which indicates the pressure in the tank and, consequently, indicates the depth of oil. The graduations 30 are preferably formed to show weight, as for instance, the number of tons of oil in the container. The size of the bore of tube 29 is such that the weight of the mercury will counterbalance the pressure of the oil acting on diaphragm 4 and, consequently, the pressure of air acting through the tube 25. As the air in chamber 21 is increased by pump 2 until it equals the pressure of the oil on the opposite side of diaphragm 14, the additional pressure will be continually acting on the mercury and will gradually cause the same to rise until the additional pressure in chamber 21 ceases which occurs when the same equals the pressure of oil against the diaphragm 14.

The tube 29 is open at both ends, the lower end being preferably normally submerged in the mercury as shown in Figure 3 while the upper end receives a conductor 30', which conductor is preferably a wire having insulation thereon, said insulation loosely fitting the bore of the tube 29. The insertion of a wire with insulation, permits the soft or cushioning effect of the insulation against the inner surface of the glass to prevent the same from breaking the tube while the lower end of the wire is exposed. The lower end of the wire may be at any desired point, as for instance, a point which would indicate that the tank is filled up to 90° of its capacity. The wire 30' is connected to a signal member 31 which may be a lamp, horn, bell or other signal member. This signal member is connected to the pipe 25 by a suitable conductor 32, there being a suitable source of current 33 interposed in this conductor. This signal device is desirable when the tank is being filled.

What I claim is:

1. A gauge for containers and the like, comprising a member adapted to be submerged in the liquid in the container and positioned near the bottom, said member including means defining an air chamber, said means having a moving part and a stationary part, said moving part having a vent adapted to be opened when the moving part is moved, an air pipe connected to said chamber, a pump for pumping air into said air pipe, a mercury container connected with one end of said pipe, and a transparent member having a bore for receiving mercury when the same is pressed by air from said air pipe, said mercury indicating by its permanent level when the air in said chamber equals the pressure exteriorly of the chamber.

2. In a gauge for containers and the like, a member comprising a casing having an open face, a diaphragm closing the open face of said casing, a tubular member connected centrally of the diaphragm and extending therethrough, said tubular member being open at the bottom end and provided with an aperture at the top end, a pipe surrounding said tubular member and spaced therefrom, said pipe being connected with said casing on the side opposite said open face, a valve member mounted in the top end of said pipe normally fitting into the aperture of said tubular member for closing the same, and means for directing air into the chamber formed by said diaphragm and said casing.

3. In a gauge for containers and the like, an actuator comprising a casing having an open side, means for directing air into said casing, a diaphragm closing the open side of the casing, a tube open at both ends connected to said diaphragm and presenting a passage-way through the diaphragm, a pipe connected with said casing and positioned so that its bore will continually be in communication with the interior of the casing, a valve member carried at the end of said pipe opposite the end connected with the casing, said tube being of such a length as to engage said valve member when the tube is raised a certain distance by said diaphragm whereby when the diaphragm is moved in one direction the chamber formed by said casing and diaphragm will be sealed by said valve member and when moved in the opposite direction said chamber will be vented through said tube.

RICHARD STAR.